April 13, 1954     F. W. SCHWINN     2,675,464
CYCLE FENDER WITH BUILT-IN LIGHT
Filed Dec. 5, 1950     2 Sheets-Sheet 1
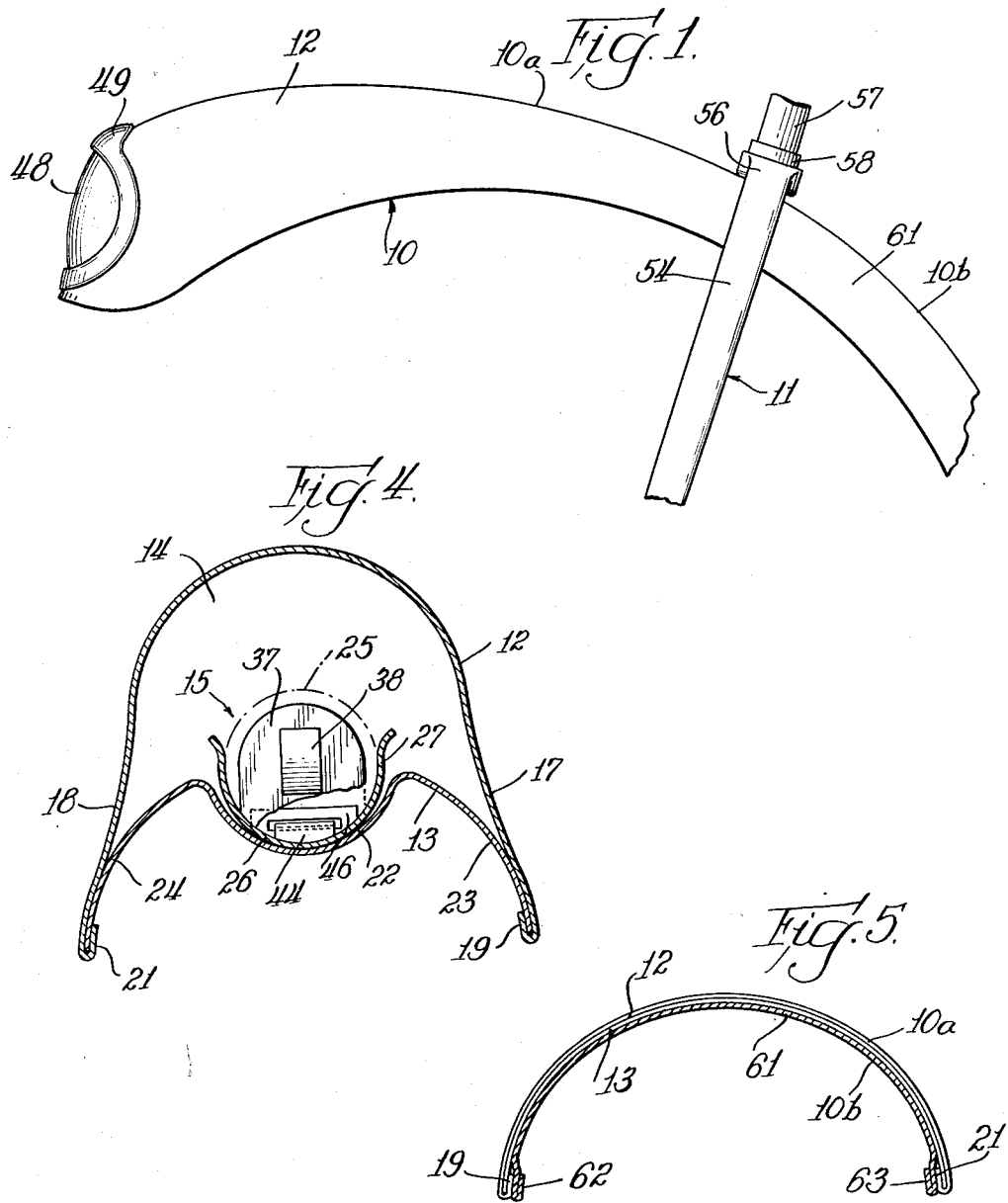
INVENTOR.
Frank W. Schwinn
BY Albert G. McCaleb
Att'y.

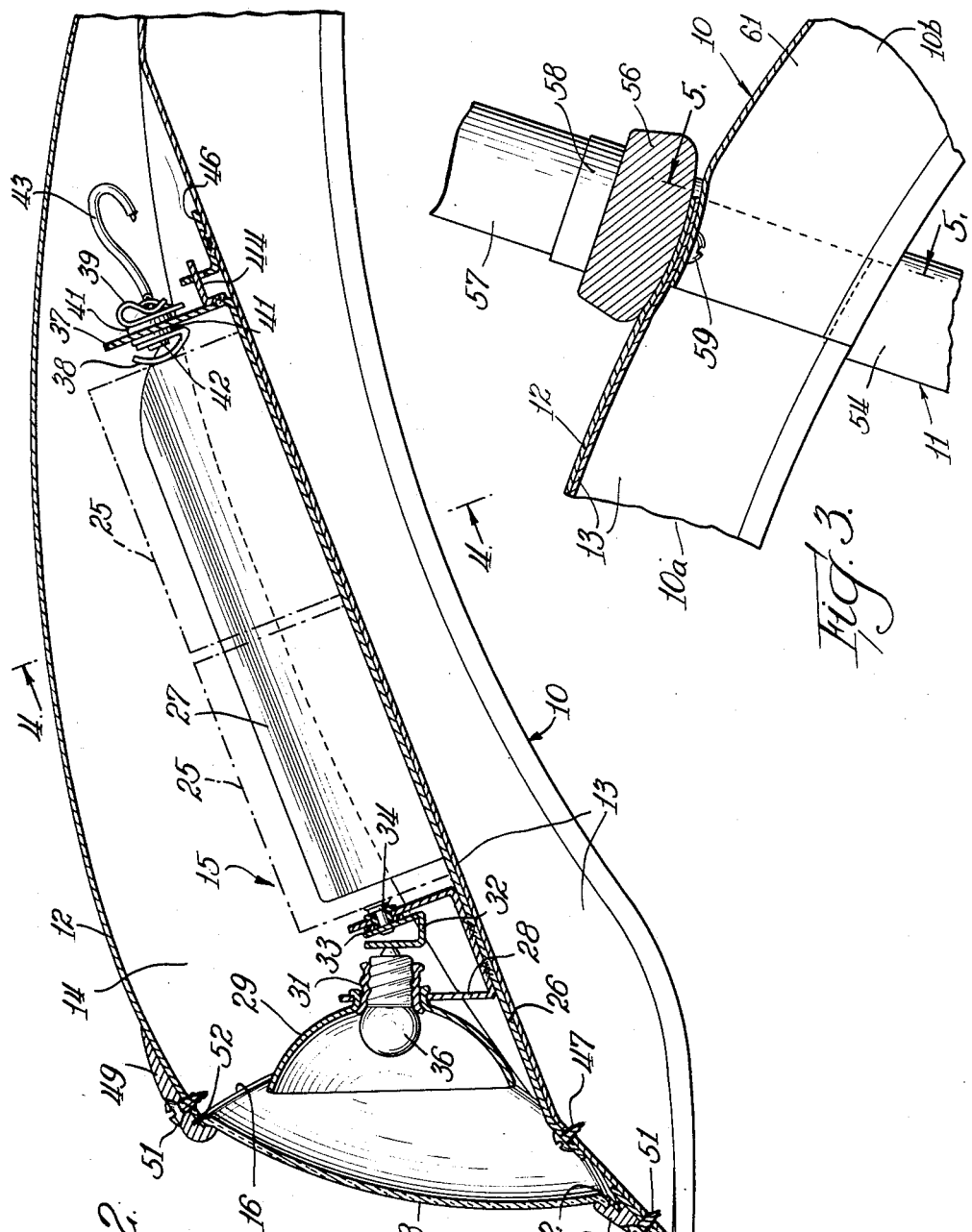

Patented Apr. 13, 1954

2,675,464

UNITED STATES PATENT OFFICE 2,675,464

CYCLE FENDER WITH BUILT-IN LIGHT

Frank W. Schwinn, Chicago, Ill.

Application December 5, 1950, Serial No. 199,279

2 Claims. (Cl. 240—7.55)

1

This invention relates to a cycle fender constructed and arranged to provide a housing for a headlight or the like.

One of the objects of my invention is to provide a cycle fender constructed of sectional parts which together constitute a unitary ensemble of sturdy construction and neat appearance embodying a closure for a headlight.

A further object of my invention is to provide a cycle fender construction in which a cycle light assembly is quickly and conveniently installed and removed, such being of particular importance in the maintenance of the cycle light and replacement of the cycle light batteries.

A still further object of my invention is the provision of a sectional cycle fender construction with a built-in cycle light which gives the appearance and effect of a one-piece fender unit while another object of my invention is the provision of a sectional cycle fender construction including a cycle fender light housed therein which is suitable for installation on a standard cycle frame.

A further object of my invention is the provision of a sectional cycle fender and fender light combination which is convenient and economical to manufacture considering its unusual sturdiness and its unified appearance and effect.

Other objects and advantages of the invention will be apparent from the following description and the accompanying drawings in which similar characters of reference indicate similar parts throughout the several views.

Referring to the two sheets of drawings,

Fig. 1 is a fragmentary side elevational view of a fender assembly embodying my invention and showing its relationship to a wheel fork of a bicycle frame;

Fig. 2 is an enlarged fragmentary side sectional view illustrating in detail my bicycle fender assembly with a bicycle light unit housed therein;

Fig. 3 is a fragmentary side sectional view depicting a portion of my preferred fender structure and its attachment to a wheel fork of a bicycle frame;

Fig. 4 is an end sectional view taken substantially on a line 4—4 of Fig. 2 and showing details of my preferred fender and light ensemble; and Fig. 5 is an end sectional view taken substantially on a line 5—5 of Fig. 3 and illustrating details and relationships of parts of my fender assembly at the point of its attachment to a wheel fork of a bicycle frame.

In the preferred embodiment of my invention as illustrated in the drawings, my fender assembly 10 is adapted to be secured to a wheel fork 11 of a bicycle frame structure and to extend circumferentially around a portion of a bicycle wheel (not shown) which is supported on the lower portion of the wheel fork 11. The fender assembly 10 provides the protective and shielding function of the conventional bicycle fender or mud guard. In addition to such shielding function, my fender or mud guard assembly 10 provides a housing for a bicycle headlight which, in appearance and effect, is part of a unitary fender construction.

As shown in detail in Fig. 2, the fender assembly 10 comprises a front fender section 10a including a cover piece 12 similar in its outside appearance to a standard front bicycle fender or mud guard. The cover piece 12 is secured to the wheel fork 11 and projects from the wheel fork circumferentially around the bicycle wheel and forwardly from the bicycle frame. Extending beneath the cover fender 12 is an under part 13 adapted to support a bicycle fender light unit 15; the under part 13 being secured to the cover piece 12 and to the wheel fork 11. The cover piece 12 and the under part 13 are spaced from each other and shaped at central portions of their forward ends to define a housing chamber 14 which receives and contains the bicycle fender light unit 15. In its forward portion, cover piece 12 is cut away to provide a headlight lens opening 16.

The cover piece 12 is of an inverted trough-like shape having downwardly depending side walls 17 and 18 terminating in inwardly folded marginal portions 19 and 21. The under fender 13 is formed with a recess 22 extending longitudinally of its mid-portion and with downwardly depending side walls 23 and 24 which, in the assembly, extend from the recess 22 into channels provided by the folded marginal portions 19 and 21 of the cover piece. The under part 13 is secured to the cover piece 12 by crimped engagement of the cover fender margins 19 and 21 against the side walls 23 and 24 of the under part. This crimped engagement extends along the full length of the assembled cover piece and under part to the position of attachment to the wheel fork 11. The recess 22 in the under part is of a configuration to receive and support operating parts of the bicycle fender light unit 15.

The fender light unit 15 which is utilized in the fender construction shown comprises a light unit tray 26 having opposed side portions curved to provide a battery clamp 27; the clamp being adapted to hold conventional flash light battery cells 25 in end-to-end relationship, as shown in dot and dash lines in Figs. 2 and 4. In the portion of the tray 26 adjacent and internally of the fender light opening 16 is a bracket 28 supporting a reflector 29 and a light bulb socket 31. Also supported by the bracket 28 is a contact spring 32 insulated from the bracket by an insulating washer 33 (Fig. 2). The contact spring 32 is secured to the bracket by a rivet 34 which serves as a contact and is adapted to engage the center terminal of the adjacent battery cell to connect the spring contact 32 with the power source; the rivet 34 being insulated from the bracket 28 by the insulating washer 33. As shown at 36, a small light bulb is engaged in socket 31 and has one terminal which engages contact spring 32.

The end of the tray 26 farthest from the fender light opening 16 is provided with an integrally formed bracket portion 37. Supported on the bracket portion 37 are contact spring 38 and spring clip connector 39. The contact spring 38 and connector 39 are insulated from the bracket portion 37 by insulating washers 41 extending around a connecting rivet 42 which holds the clip connector and the contact spring on the bracket. The clip connector 39 engages a switch wire 43 which extends to one terminal of a conventional bicycle light switch (not shown), the other terminal of which is grounded to the bicycle frame.

To secure the battery tray 26 in place within the housing chamber 14, a retaining prong 44 is secured to, and extends rearwardly from the bracket portion 37 of the battery clip tray and engages prong receiving member 46 which is attached to the under part 13 of the fender. The forward portion of the tray is secured to the under part 13 by a screw 47 extending through the tray and threaded into the under part.

Fender light opening 16 is closed by a lens 48 which is held in place by a bezel 49. Suitable fastening means such as screws 51 removably secure the bezel 49 to the cover piece 12 of the fender. A protective gasket 52 is interposed between the edges of lens 48 and the cover piece 12 to provide an effective moisture seal.

For servicing or effecting removal of the light unit 15 relative to the chamber 14, the bezel 49 and lens 48 are removed from light opening 16 after removal of screws 51. Screw 47 is then removed and the light unit tray 26 is withdrawn from the housing chamber; the switch wire 43 having sufficient slack to permit such withdrawal without being disconnected from the clip connector 39. After desired maintenance or repairs, such as replacement of the light bulb or the batteries, has been effected, the tray 26 is reinserted within the housing chamber 14; the retaining prong 44 being engaged within prong receiving member 46 and screw 47 being placed and tightened. The lens 48 and bezel 49 are then secured in place over light opening 16. The light unit 15 is turned on and off by a conventional switch which completes the circuit between the light bulb 36 and the flashlight batteries through the bicycle frame and the fender assembly.

As shown in Fig. 3, the cover piece 12 and the under part 13 are secured together and to the wheel fork 11. The wheel fork comprises side arms 54 extending upwardly from both sides of the front wheel axle and affixed to a wheel fork bridge portion 56; the bridge portion having a steering post 57 secured thereto and projecting upwardly therefrom with a collar 58 intermediate the tube and the bridge portion. The cover piece 12 and the under part 13 which are now in contiguous lengthwise relationship extend between the side arms 54 and are removably secured to the bridge portion 56 by fastening means, such as a screw 59.

In the disclosed embodiment of the invention, the cover piece 12 and the under part 13 of the front fender section both terminate at the bridge portion of the wheel fork 11. Additional shielding around the circumference of the wheel results from the use of a supplemental fender section 10b which is joined to front fender section 10a at the wheel fork 11. The supplemental fender section 10b is of the same general shape and size at the wheel fork 11 as the rear end of the front fender section 10a, and comprises a fender shell 61 having return bent marginal portions 62 and 63 for stiffening the structure. In securing the fender sections 10a and 10b together and to the wheel fork 11, the forward end of the fender shell 61 is nested beneath and inside the rear end portion of under part 13 of the front fender section. Screw 59 extends through the overlapped end portions of the fender sections and into collar 56. The disclosed structure, although sectional, has the appearance and effect of a continuous and unitary fender construction, since the edges and slight offset of the fender section are hidden beneath the bridge portion 56 of the fork. It is to be understood that conventional fender braces may be utilized to provide additional support for the fender sections; such braces extending outwardly from the front wheel axle. This rigid attachment of the fenders 12 and 13 to the wheel fork has the advantage of concealing the presence of double fender joint so that an appearance of a unitary fender construction is provided.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a bicycle fender structure which provides a housing for a headlight having a lens at one end of the fender, the combination comprising two juxtaposed fender parts adapted to overlie a peripheral portion of a bicycle wheel and provide a shielding cover therefor, each of said parts having a section in the general shape of an inverted U and the sectional shapes and proportions of the parts being so related that with their side marginal portions in adjacent and engaging relationship and their marginal portions at one end adjacent and in engagement the mid-portions thereof define a headlight housing which tapers away from said one end, one of said parts having a lens opening therein at said one end, and said parts being secured together by having marginal portions of one folded around the marginal portions of the other along the opposite sides and across the said one end.

2. In a bicycle fender structure which provides a housing for a headlight as defined in claim 1, the combination being further characterized by a light unit mounted in said headlight housing and having a base strip to which the parts of the light unit are secured, said base strip having a tongue at one end thereof, means within the housing remote from the lens opening and secured to one of the fender parts for releasably holding the tongue when the light unit is in place within the housing, and means including a removable fastener adjacent to and accessible through the lens opening for securing the other end of the base strip to one of the fender parts, whereby the light unit is readily removable from and replaceable in the housing.

References Cited in the file of this patent

UNITED STATES PATENTS

| Number | Name | Date |
|---|---|---|
| 2,060,527 | Peterson | Nov. 10, 1936 |
| 2,106,231 | Wiley | Jan. 25, 1938 |
| 2,542,613 | Aufiero | Feb. 20, 1951 |

FOREIGN PATENTS

| Number | Country | Date |
|---|---|---|
| 604,508 | Germany | Oct. 22, 1934 |